United States Patent [19]
Seegert et al.

[11] Patent Number: 5,784,870
[45] Date of Patent: Jul. 28, 1998

[54] POWER LIFT MECHANISM FOR MOWER DECK

[75] Inventors: Brian David Seegert; Royal Aaron Henning, both of Hartford; Daniel Angelo Sebben, West Bend; Timothy Paul Zellmer, Horicon; William Garrald Cameron, Juneau; Wayne Robert Hutchison, Mayville, all of Wis.

[73] Assignee: Deere & Company, Moline, Ill.

[21] Appl. No.: 621,278

[22] Filed: Mar. 22, 1996

[51] Int. Cl.$^6$ .................................................. A01D 67/00
[52] U.S. Cl. ................... 56/320.1; 56/17.1; 56/DIG. 22; 476/26
[58] Field of Search .................. 56/17.2, 320.1, 56/DIG. 22, 15.6, 15.7, 15.8, 15.2, 17.1, 2; 476/26, 19

[56] References Cited

U.S. PATENT DOCUMENTS

| | | | |
|---|---|---|---|
| 1,530,053 | 3/1925 | Mueller | 476/26 X |
| 2,622,689 | 12/1952 | Szager | 476/26 X |
| 2,711,624 | 6/1955 | Crump | 56/DIG. 22 X |
| 3,720,112 | 3/1973 | Enters et al. | 476/26 X |
| 3,795,094 | 3/1974 | Mollen et al. | 56/15.8 X |
| 3,813,954 | 6/1974 | Price et al. | 476/19 |
| 4,271,378 | 6/1981 | Knauff | 476/26 X |
| 4,318,266 | 3/1982 | Taube | 56/10.5 X |
| 4,663,923 | 5/1987 | Boice | 56/DIG. 22 X |
| 5,042,239 | 8/1991 | Card | 476/26 X |
| 5,353,578 | 10/1994 | Irby et al. | 56/11.1 |

OTHER PUBLICATIONS

Deere & Co., John Deere brochure DKA55 entitled "John Deere Snow Removal Equipment", 8 pp. (see particularly p. 2) dated Aug. 1994, published in the U.S.A.

Deere & Co., John Deere Parts Catalog PC2302 for TRS22, TRS24, TRX24, TRS26 and TRX26 Walk Behind Snowblowers, 2 pp.–30–34 and 30–35, dated Nov. 3, 1994, published in the U.S.A.

Deere & Co., John Deere Parts Catalog PC2428 for 325 and 345 Lawn & Garden Tractors, 6 pp.–80–2, 80–3, 80–4, 80–5, 70–2 and 70–3, dated 11 Aug. 1994, published in the U.S.A.

Deere & Co., John Deere Parts Catalog PC2399 for STX38, STX46 (Black Mower Deck) Lawn Tractors, 2 pp.–85–2 and 85–3, dated 19 Sept. 1995, published in the U.S.A.

Deere & Co., John Deere Parts Catalog PC2317 for LX172, LX176, LX178, LX186 and LX188 Lawn Tractors, 2 pp.–85–20 and 85–21, dated 1 Feb. 1995, published in the U.S.A.

Deere & Co., John Deere Parts Catalog PC2304 for TRS27 and TRS32 Walk–Behind Snow Blowers, 2 pp.–30–13 and 30–14, dated 22 Sep. 1992, published in the U.S.A.

Simplicity, Simplicity Parts Manual TP–901–04 for Models 560, 760, 860, 870 & 1080 Snowthrowers & Attachments, 5 pp.–Front Cover and 10–13, published in the U.S.A. (No date).

*Primary Examiner*—Tamara L. Graysay
*Assistant Examiner*—Thomas A. Beach

[57] ABSTRACT

A mower deck lift mechanism which includes a friction disk selectively pivotable into engagement with first and second pulleys of a double pulley jacksheave. A linkage coupled between the friction disk and the deck raises the mower deck when the friction disk engages and rotates with the first pulley, and lowers the deck when the friction disk engages and rotates with the second pulley. Neutral return mechanisms are provided for returning the friction disk to a neutral position when the operator releases a control and when the deck approaches its extreme raised or lowered positions. A cutting height preset mechanism is also provided.

23 Claims, 5 Drawing Sheets

POWER LIFT MECHANISM FOR MOWER DECK

FIELD OF THE INVENTION

This invention relates to powered lift mechanisms for raising and lowering an implement or attachment such as a mower deck.

BACKGROUND OF THE INVENTION

Vehicles such as lawn tractors are typically provided with mower decks within which grass and vegetation are cut by a mower blade. It is known to provide such vehicles with a lift mechanism which allows the operator to adjust the vertical position of the mower deck. This allows the operator to adjust the height at which the grass and vegetation is cut, and also allows the operator to lift the deck to a raised transport position.

A first type of lift mechanism includes a series of linkages and levers for manually raising and lowering the mower deck. An operator must engage a lever with his hand and apply a force to the lever which will be transmitted by the linkage to the mower deck for adjusting the height of the mower deck. This type of lift mechanism requires the operator to manually lift and lower the deck via the lever and linkage, and may require the operator to exert a relatively large amount of force to the lever. Due to this large force required of the operator, some operators find these manual lift mechanisms difficult to operate.

A second type of lift mechanism is powered by the vehicle and applies a force to the mower deck by utilizing the power of the vehicle engine. This type of lift mechanism typically includes a linkage coupling the mower deck to the vehicle, and hydraulic cylinders which apply a force to the linkage for lifting and lowering the deck with respect to the vehicle. The hydraulic cylinders are powered by the vehicle power source or engine, and the operator is merely required to manipulate a control such as a switch or button to raise and lower the mower deck. Therefore, this type of powered lift mechanism requires little effort on the part of the operator. However, the powered lift mechanisms include parts, such as the hydraulic system and cylinders, which undesirably raise the cost of manufacture and assembly.

Therefore, it would be desirable to provide a mower deck lift mechanism which does not require the operator to exert a large amount of force to raise or lower the deck, and which is simple in construction and relatively inexpensive to manufacture and assemble.

SUMMARY OF THE INVENTION

The preferred embodiment of the present invention provides a mower deck lift mechanism which is activated by an operator by pivoting a control lever. The control lever shifts a control rod, which operatively pivots a mounting bracket. Pivoting of the mounting bracket will bring a friction disk into contract with either a first or second pulley, depending upon whether the deck is being raised or lowered. Contact of the friction disk against one of the pulleys causes the friction disk to rotate in one of two opposite directions. Rotation of a threaded rod coupled to the friction disk causes a thread engaging member to shift axially along the threaded rod. A lever engages the thread engaging member and pivots as the thread engaging member shifts. A linkage coupled between the lever and the deck causes the deck to shift up or down as the lever pivots. First and second cam surfaces engage the thread engaging member and serve to pivot the friction disk to a neutral position away from the pulleys as the deck approaches its extreme raised or lowered positions. A neutral return spring operatively biases the friction disk to return to a neutral position spaced from both pulleys when the operator releases the control lever. The present invention also provides a cutting height preset mechanism which allows the operator to select a desired cutting height.

The present invention therefore provides a mower deck lift mechanism which does not require the operator to exert a large force when raising or lowering the deck. The present invention is also compact, simple in construction and relatively inexpensive to manufacture and assemble.

DETAILED DESCRIPTION OF THE PREFERRED EMBODIMENT

Figure 1:
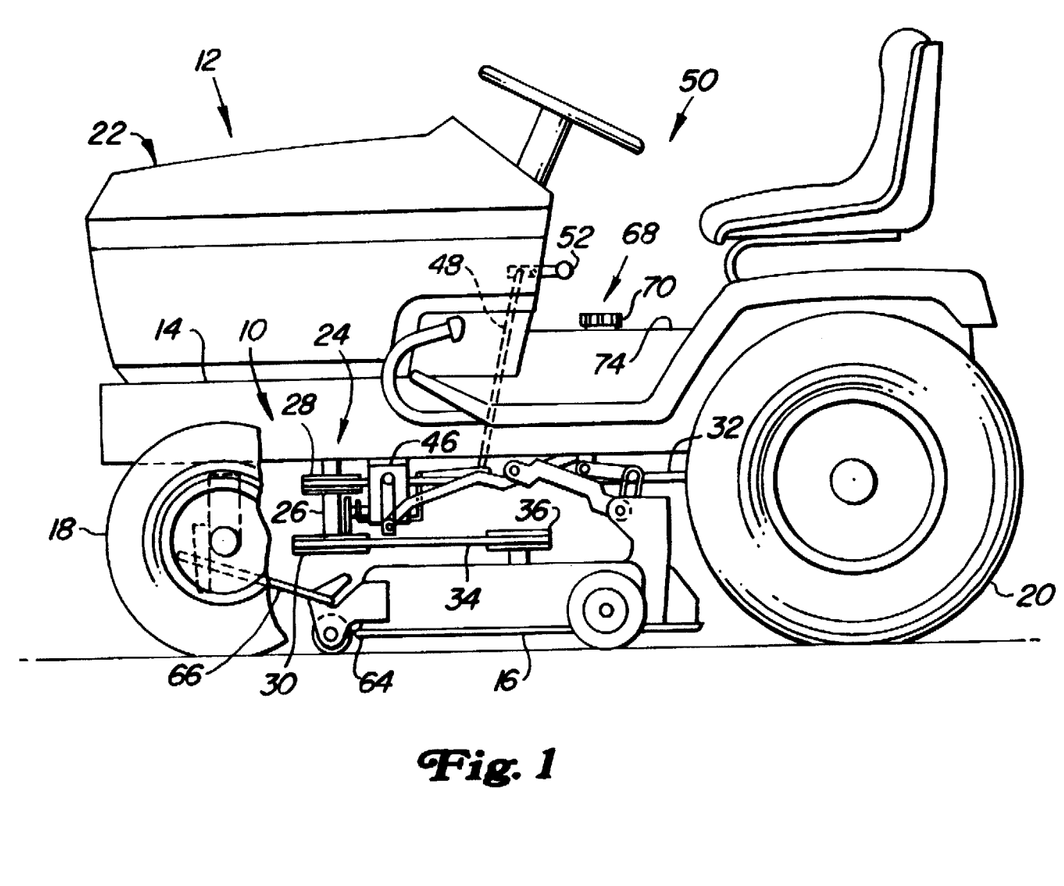
FIG. 1 is a side view of a lawn tractor having a mower deck and a powered lift mechanism according to the present invention adapted for raising and lowering the deck.

Referring now to FIGS. 1–8, there is shown the mower deck lift mechanism 10 according to the present invention. As seen in FIG. 1, a vehicle 12 such as a lawn tractor includes a structural frame 14 and a mower deck 16 coupled thereto. The mower deck 16 shown in FIG. 1 is coupled to the vehicle 12 beneath the frame 14 and generally between the front 18 and rear pairs 20 of ground engaging wheels. The vehicle 12 includes a power source or engine 22 having an output shaft which operatively drives the rear drive wheels 20, mower deck 16 and other implements.

A jacksheave 24 having a central shaft 26, as seen in FIGS. 1, 2, 3, 5, 6 and 7, is operatively coupled with the output shaft of the engine 22. Fixed for rotation with the shaft 26 are first and second plate members or pulleys 28 and 30. The first pulley 28 engages a drive belt 32 which extends rearwardly to drive the vehicle transmission and thereby provides driving force to the rear pair of ground engaging drive wheels 20. The second pulley 30 is engaged by a mower belt 34 which is also engaged with mower deck pulleys 36. The second pulley 30 provides driving force which is transmitted to the mower blades via the mower belt 34 and mower deck pulleys 36.

The present invention includes a lift mechanism 10 which serves to selectively raise and lower the mower deck 16 during mowing operations. The lift assist mechanism 10 includes a friction disk 38 which is positioned between the first and second pulleys 28 and 30. A threaded rod or driven member 40 is fixed for rotation with the friction disk 38. A pivotable mounting bracket 42 rotatively supports the threaded rod 40. The mounting bracket 42 is pivotally coupled via pin members 44 to a brace member 46 which is rigidly fixed with the vehicle frame 14. A control arm 49 fixed to the mounting bracket 42 is operatively coupled with an operator control rod 48. The control rod 48 extends upwardly to the operator station 50 and is operatively coupled with a hand engagable control lever member 52 which the operator can pivot up or down to affect raising or lowering of the mower deck 16. The hand lever 52 is pivotally mounted to the vehicle frame 14. A thread engaging member 54 is engaged on the threads of the threaded rod 40. Portions 55 of the thread engaging member 54 abut against a lever member 56 which is fixed with a transverse shaft 58 pivotally supported by the brace 46. An arm member 60 fixed with the transverse shaft 58 is coupled via a linkage 62 to the mower deck 16 for raising and lowering the deck 16 as the lever 56 pivots back and forth about the axis of the transverse shaft 58 in response to shifting of the thread engaging member 54. The front portion 64 of the deck 16 is supported by a support member 66 which is swingably coupled to the vehicle 12. The support member 66 supports the front portion 64 of the deck 16 as the deck 16 shifts between its various raised and lowered positions.

Figure 2:
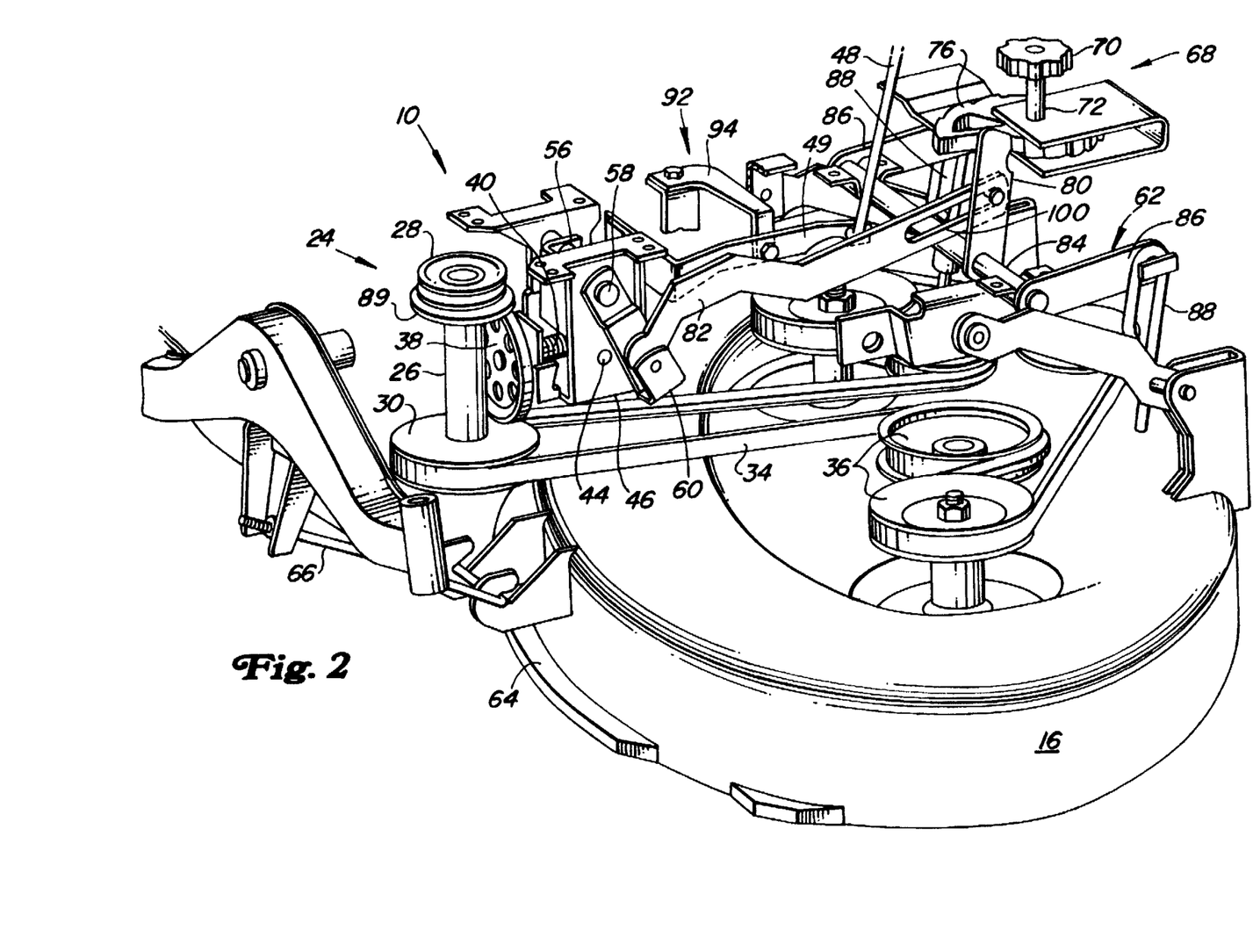
FIG. 2 is a perspective view of the lift mechanism according to the present invention with the vehicle not shown.
Figure 4:
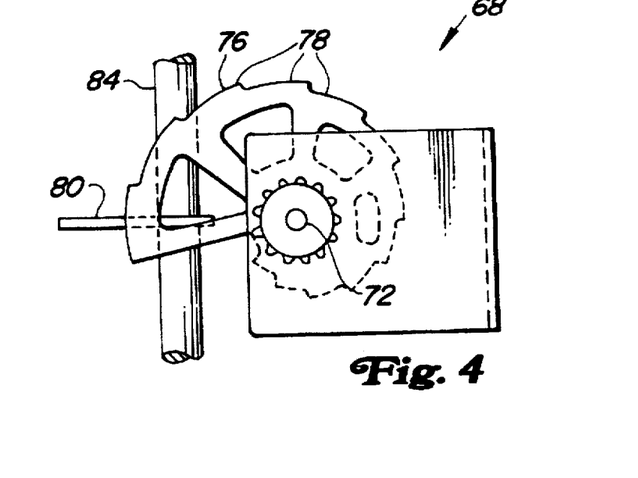
FIG. 4 is a partial plan view of the height preset mechanism according to the present invention.

A height of cut preset mechanism 68 is also provided by the present invention. As seen in FIGS. 1 and 2, a knob 70 is positioned in the operator's station 50 and is supported by a shaft 72 which extends through the floor 74 of the operator's station 50. A cam wheel 76, as best seen in FIGS. 2 and 4, is coupled with the lower portion of the shaft 72, and includes a series of offset step portions 78. A height setting lever 80 is coupled with the lift linkage 62 and pivots about its axis as the mower deck 16 is raised and lowered. The height setting lever 80 engages the stepped portions 78 of the cam wheel 76 for setting the height at which the deck 16 is positioned. The different step portions 78 of the cam wheel 76 correspond with different height settings of the mower deck 16.

Next, the operation of the present invention will be described in greater detail. To lower the mower deck 16, the operator presses downwardly on the hand lever 52 in the operator's station 50. The control rod 48 shifts upwardly with the front portion of the hand lever 52, which pivots the control arm 49, mounting bracket 42 and friction disk 38 to the position shown in FIG. 5. In this pivoted position, the friction disk 38 engages the second pulley 30 and begins rotating therewith. With the friction disk 38 engaged with the second pulley 30, the friction disk 38 and threaded rod 40 rotate in the direction indicated by Arrow A in FIG. 7. As the threaded rod 40 rotates with the friction disk 38, the thread engaging member 54 is shifted by the threads away from the friction disk 38 and in the direction indicated by Arrow B in FIG. 7. As the thread engaging member 54 shifts away from the friction disk 38, the lever member 56 pivots counterclockwise as viewed in FIG. 5 and away from the friction disk 38. Shifting of the lever 56 away from the friction disk 38 causes the lift linkage 62 to shift to allow the mower deck 16 to be lowered under its own weight. As the lever member shifts away from the friction disk 38, the arm and a strap 82, as best seen in FIG. 2, shift rearwardly which causes the height setting lever 80 to shift rearwardly and clockwise, as viewed in FIG. 2. A shaft 84 coupled with the height setting lever 80 pivots therewith and allows a pair of deck levers 86 to pivot clockwise from their positions shown in FIG. 2. The deck levers 86 are coupled with the deck 16 via hangers 88, and allow the deck 16 to be lowered by the force of gravity.

To initiate raising of the mower deck 16, the operator presses upwardly on the control lever 52 in the operator's station 50 which shifts the control rod 48 downwardly. The mounting bracket 42 and the control arm 49 coupled with the control rod 48 pivot clockwise from the position shown in FIG. 3. This causes the friction disk 38 to pivot upwardly until it engages a first plate member 89. Upon engagement with the first plate member 89, the friction disk 38 and threaded rod 40 begin rotating therewith in a direction indicated by Arrow A in FIG. 6. The thread engaging member 54 is thereby caused to shift along the threaded rod 40 toward the friction disk 38 and in direction of Arrow B in FIG. 6. This forces the lever 56 in a clockwise direction from its position shown in FIG. 3 as the thread engaging member 54 shifts toward the friction disk 38. Clockwise pivoting of the lever 56, transverse shaft 58 and arm 60 causes the strap 84 to shift to the left from its position shown in FIG. 2. This causes the height setting lever 80, shaft 84 and the pair of deck levers 86 to pivot in a counterclockwise direction, which serves to lift the deck 16 via the hangers 88.

Figure 3:
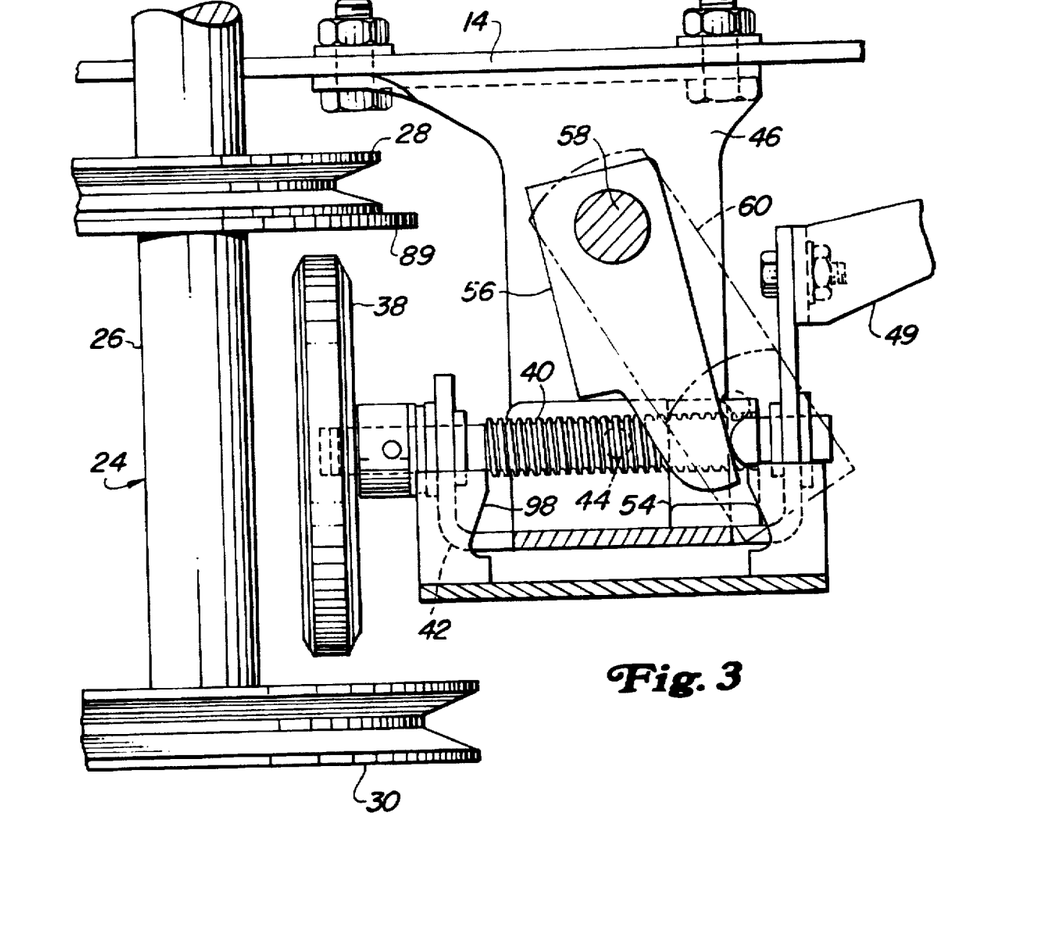
FIG. 3 is a side view of a portion of the present invention showing the pivotable friction disk in its neutral position spaced from both the first and second pulleys.

The lift mechanism 10 also includes a neutral configuration. When the friction disk 38 is spaced from both the first and second pulleys 28 and 30, as shown in FIG. 3, the friction disk 38 and threaded rod 40 will not rotate. Therefore, in the configuration shown in FIG. 3 the mower deck 16 is not being lifted or lowered.

The present invention also includes a neutral return mechanism 92 in the form of a metal leaf spring member 94 coupled between the frame 14 and the control arm 49. When the operator releases the control lever 52 in the operator station 50, the spring member 94 will act to bias or return the control arm 49 and mounting bracket 42 to its neutral position whereat the friction disk 38 is spaced from both the first and second pulley members 28 and 30.

Figure 5:
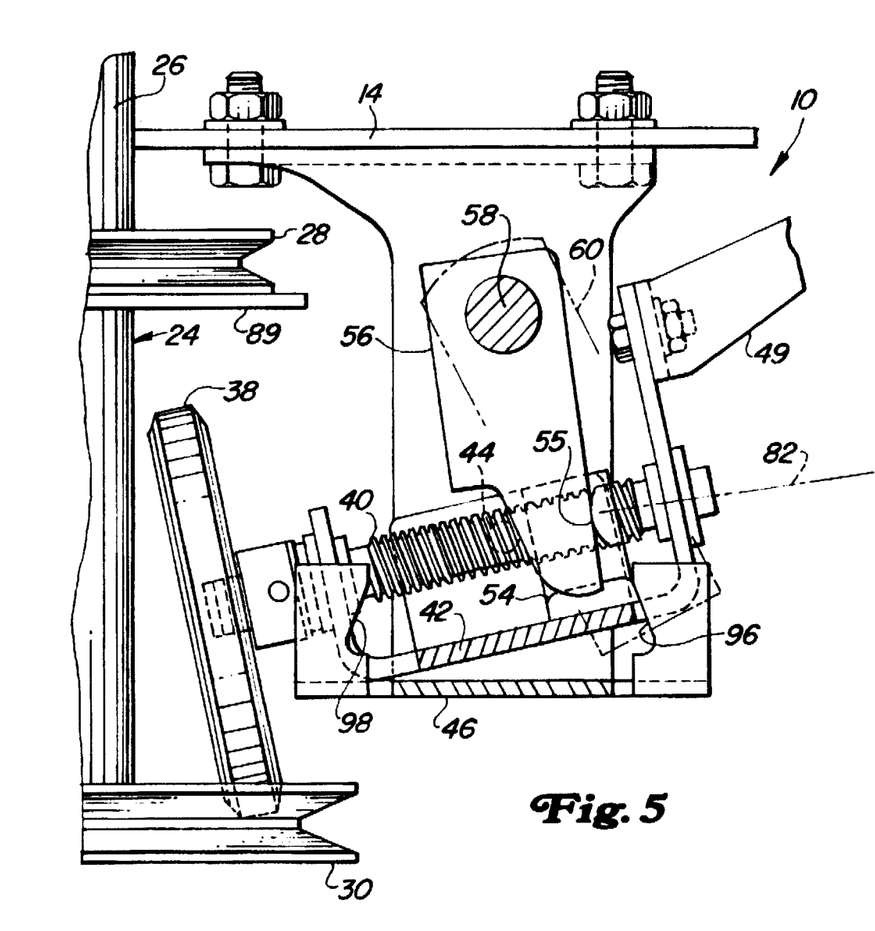
FIG. 5 is a partial side view of the present invention showing the mechanism in its mower deck lowering configuration.
Figure 6:
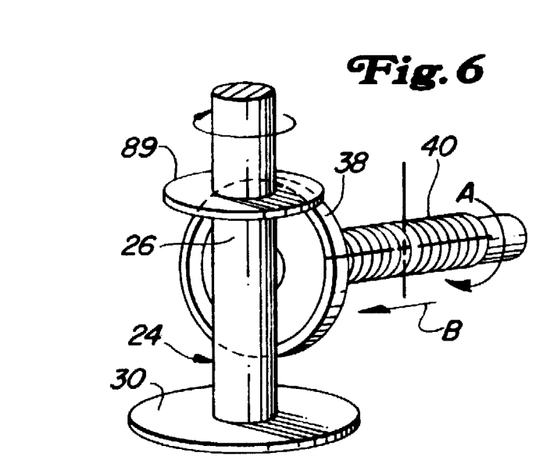
FIG. 6 is a schematic view of the present invention showing the directions of rotation of the shaft and threaded rod and also the thread engaging member's direction of travel when the mechanism is in its deck lifting mode.
Figure 7:
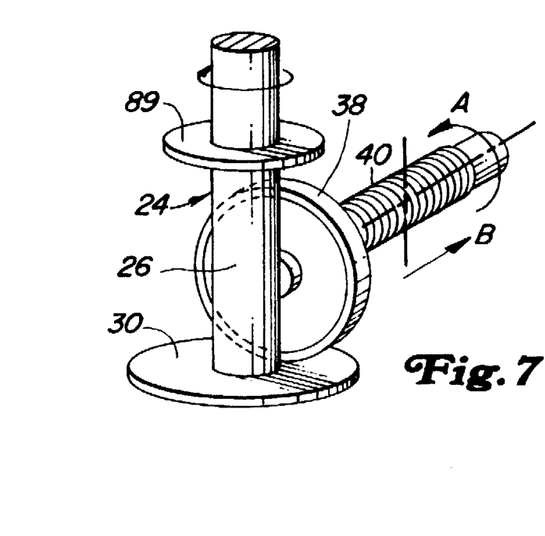
FIG. 7 is a schematic view of the present invention showing the direction of rotation of the shaft and threaded rod and also the thread engaging member's direction of travel when the mechanism is in its deck lowering mode.
Figure 8:
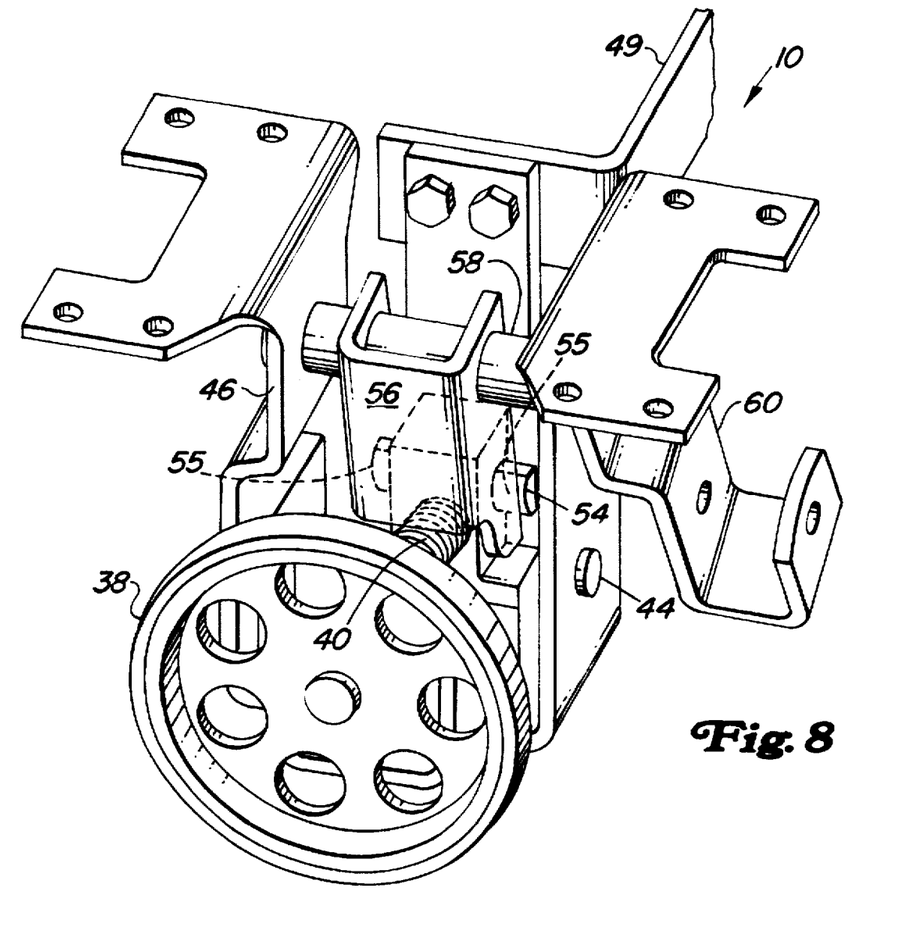
FIG. 8 is a perspective partial view of the present invention.

The present invention also provides a neutral return mechanism which is activated when the deck 16 reaches its extreme raised and lowered positions. When lowering the deck 16, the friction disk 38 will engage the second pulley 30 which causes the threaded rod 40 to rotate and shift the thread engaging member 54 away from the friction disk 38, as shown in FIG. 5. As the mower deck 16 approaches its extreme lowered position, the thread engaging member 54 will abut against a first cam surface 96 which will cause the thread engaging member 54 to shift downwardly as it shifts axially away from the friction disk 38, thereby pivoting the mounting bracket 42 clockwise and the friction disk 38 away from the second pulley 30. The first cam surface 96 therefore acts to terminate the downward motion of the deck 16 by shifting the friction disk 38 out of engagement with the second pulley 30 and back to the neutral configuration when the deck 16 reaches its extreme lowered position. Similarly, as the mower deck 16 approaches its extreme raised position, the thread engaging member 54 will shift toward the friction disk 38 until it abuts against a second cam surface 98 which causes the thread engaging member 54 to shift downwardly, causing the friction disk 38 to pivot downwardly out of engagement with the first pulley 28. The present invention therefore provides a neutral return mechanism which is activated as the mower deck 16 approaches either its extreme raised or lowered positions.

The present invention also provides a height setting mechanism 68 which is best seen in FIGS. 2 and 4. When the mower deck 16 is in its extreme raised position, the operator can turn the dial 70 to the appropriate cutting height setting and then lower the mower deck 16 by manipulating the lever 52 in the operator's station 50. The mower deck 16 will then be lowered by gravity until the height setting lever 80 abuts against the step 78 of the cam wheel 76 which corresponds with the height setting selected by the operator. This height setting mechanism 68 therefore allows the operator to quickly return the mower deck 16 to a desired cutting height.

The present invention is provided with a slot 100 formed in the strap 82 which allows the neutral return cam surfaces 96 and 98 to function when the height setting mechanism 68 is utilized. As the deck 16 is lowered to a preset cutting height the height setting lever 80 will abut the cam wheel 76. The height setting lever 80, shaft 84, and deck levers 86 will thereby be blocked from shifting and lowering the deck 16 further. The friction disk 38, however, remains engaged with the second pulley 30 and continues to operatively shift the thread engaging member 54, lever member 56, arm 60 and strap 82 rearwardly. The slot 100 formed in the strap serves as a lost motion mechanism which allows the strap 82 to continue shifting rearwardly even after the height setting lever 80 abuts against the cam wheel 76. As the friction disk 38 continues rotating in contact with the second pulley 30, the thread engaging member 54 continues shifting axially along the threaded rod 40 and away from the friction disk 38 until it abuts against the first cam surface 96. Abutment with the first dam surface 96 causes the thread engaging member 54 to shift downwardly, which also shifts the pivotable mounting bracket 42 and friction disk 38 back to their neutral positions shown in FIG. 3. This lost motion feature therefore allows the operator to select a desired cutting height by merely adjusting the knob 70 to the desired setting and then pressing downward on the hand lever 52 for lowering the deck to the selected height. The lift mechanism 10 automatically returns to a neutral mode and does not require the operator to release the hand lever 52 immediately upon sensing the deck has reached the desired cutting height and the lever 80 has contacted the cam wheel 76.

The present invention therefore provides a mower deck lift mechanism 10 which is powered by the vehicle engine 22 and is therefore relatively easy for the operator to control without requiring the operator to exert large forces to lift or lower the deck 16. The present invention is relatively simple in construction and does not include hydraulic cylinders or other complex or costly structures which would raise the cost of manufacturing the lift mechanism.

The present invention could also be utilized to provide driving torque to an implement or ground engaging drive wheels. For example, instead of being adapted for raising and lowering a mower deck 16 as shown in the attached drawing figures, the threaded rod or driven member 40 could be operatively coupled with a drive shaft which would drive ground engaging wheels of a vehicle such as a walk-behind mower, sweeper or snow thrower. Operative pivoting of friction disk 38 between its various positions would allow the operator to drive the vehicle in forward, neutral and reverse modes.

The friction disk 38 is described herein-as being adapted for engagement with a first plate 89 positioned proximate the first pulley 28. The first pulley 28 shown in the drawings is relatively small and may not provide a large enough surface for the friction disk 38 to engage. Therefore, the larger first plate member 89 is provided for engagement by the friction disk 38. If the first pulley is of sufficiently large diameter, the friction disk 38 could be adapted for directly engaging the first pulley without departing from the spirit of the present invention. The friction disk 38 is shown as being directly engagable with the second pulley 30 which serves as a plate-like member. However, the friction disk could be adapted to directly engage a pair of plates, or a pair of pulleys without departing from the spirit of the present invention.

We claim:

1. A mechanism for applying rotative force to a driven member comprising:

a shaft operatively rotatably driven by a power source, first and second plate members mounted with the shaft, said first and second plate members being spaced from one another to define a space therebetween, a disk to which the driven member is operatively coupled for rotation, said disk being positioned generally between the first and second plate members, said disk being pivotable to and between first, second and third positions, wherein:
   in its first position, the disk abuts the first plate member for rotation therewith for causing the driven member to rotate in a first direction,
   in the second position, the disk abuts the second plate member for rotation therewith for causing the driven member to rotate in a second direction opposite to the first direction, and
   in the third position, the disk is spaced from both the first and second plate members such that the driven member is not caused to rotate in either direction, wherein said first plate member further comprises a first pulley operatively coupled with the shaft, and said second plate member further comprises a second pulley operatively coupled with the shaft.

2. The invention of claim 1, wherein the mechanism is carried by a vehicle and the driven member is operatively coupled with a vehicle implement for raising and lowering said implement as the driven member rotates in the first and second directions.

3. The invention of claim 2, wherein:

the driven member further comprises a threaded rod member operatively coupled for rotation with the disk, a thread engaging member is engaged with the threads for shifting axially with respect to the rod member in first and second opposite directions as the rod member rotates in the first and second directions, respectively, and a pivotable lever member operatively engages the thread engaging member and is operatively coupled with the implement for raising and lowering the implement as the thread engaging member shifts in the first and second directions respectively.

4. The invention of claim 3, wherein said thread engaging member is shiftable within a range of positions on the rod member between first and second outermost positions, and said thread engaging member operatively abuts a first cam surface as the thread engaging member approaches the first outermost position for operatively pivoting the threaded rod member and disk toward the third position.

5. The invention of claim 4, and further comprising a second cam surface against which the thread engaging member is operatively abutable for operatively pivoting the threaded rod member and disk toward the third position as the thread engaging member approaches the second outermost position.

6. The invention of claim 2, wherein said shaft operatively drives the vehicle and the implement via the first and second pulleys, respectively.

7. The invention of claim 1, wherein at least one pulley is operatively coupled for rotation with the shaft for driving a belt.

8. The invention of claim 1, wherein the driven member further comprises a threaded rod member operatively coupled for rotation with the disk, and     a thread engaging member is engaged with the threads for shifting axially with respect to the rod member in first and second opposite directions as the rod member rotates in the first and second directions, respectively, said thread engaging member being shiftable within a range of positions on the rod member between first and second outermost positions, and said thread engaging member operatively abuts a first cam surface as the thread engaging member approaches the first outermost position, and said abutment of the thread engaging member against the first cam surface operatively pivots the threaded rod member and disk toward the third position.

9. The invention of claim 8, and further comprising a second cam surface against which the thread engaging member is operatively abutable for operatively pivoting the threaded rod member and disk toward the third position as the threaded member approaches the second outermost position.

10. A mechanism for shifting position of an implement mounted to a vehicle, comprising:

a shaft operatively rotatively driven by a power source mounted with the vehicle,     first and second plate members mounted with the shaft, a space being defined between said first and second plate members,     a friction disk positioned within the space defined between the first and second plate members,     a driven member coupled for rotation with the friction disk and being operatively coupled with a linkage which shifts the position of the implement as the driven member rotates in first and second opposite directions with the friction disk,     said friction disk being pivotable to and between a first position, second position and a neutral position, wherein:

in the first position the friction disk abuts a portion of the first plate member for rotating therewith in a first direction, which causes the implement to shift in a first direction,         in the second position the friction disk abuts a portion of the second plate member for rotating therewith in the second direction, which causes the implement to be shifted in a second direction opposite to the first direction, and         in the neutral position the friction disk is spaced from both the first and second plate members.

11. The invention of claim 10, wherein said second plate member is a belt engaging pulley mounted with the shaft.

12. The invention of claim 11, wherein said first plate member is a belt engaging pulley mounted with the shaft.

13. The invention of claim 12, wherein said first and second pulleys operatively drive ground engaging drive wheels and the implement.

14. The invention of claim 13, wherein:

the driven member further comprises a threaded rod member operatively coupled for rotation with the disk,     a thread engaging member is engaged with the threads for shifting axially with respect to the rod member in first and second opposite directions as the rod member rotates in the first and second directions, respectively, and     a pivotable lever member operatively engages the thread engaging member and is operatively coupled with the implement for raising and lowering the implement as the thread engaging member shifts in the first and second directions respectively.

15. The invention of claim 14, wherein said thread engaging member is shiftable within a range of positions on the rod member between first and second outermost positions, and said thread engaging member operatively abuts a first cam surface as the thread engaging member approaches the first outermost position, wherein said abutment causes the threaded rod member and disk to pivot toward the third position.

16. The invention of claim 15, and further comprising a second cam surface against which the thread engaging member is operatively abutable for operatively pivoting the threaded rod member and disk toward the third position as the thread engaging member approaches the second outermost position.

17. The invention of claim 10, wherein:

the driven member further comprises a threaded rod member operatively coupled for rotation with the disk,     a thread engaging member is engaged with the threads for shifting axially with respect to the rod member in first and second opposite directions as the rod member rotates in the first and second directions, respectively, and     a pivotable lever member operatively engages the thread engaging member and is operatively coupled with the implement for raising and lowering the implement as the thread engaging member shifts in the first and second directions respectively.

18. The invention of claim 17, wherein said thread engaging member is shiftable within a range of positions on the rod member between first and second outermost positions, and said thread engaging member operatively abuts a first cam surface as the thread engaging member approaches the first outermost position, wherein said abutment causes the threaded rod member and disk to pivot toward the third position.

19. The invention of claim 18, and further comprising a second cam surface against which the thread engaging member is operatively abutable for operatively pivoting the threaded rod member and disk toward the third position as the thread engaging member approaches the second outermost position.

20. A mechanism for applying rotative force to a driven member comprising:

a shaft operatively rotatably driven by a power source, first and second plate members mounted with the shaft, said first and second plate members being spaced from one another to define a space therebetween,     a disk to which the driven member is operatively coupled for rotation, said disk being positioned generally between the first and second plate members,     said disk being pivotable to and between first, second and third positions, wherein:

in its first position, the disk abuts the first plate member for rotation therewith for causing the driven member to rotate in a first direction,         in the second position, the disk abuts the second plate member for rotation therewith for causing the driven member to rotate in a second direction opposite to the first direction, and         in the third position, the disk is spaced from both the first and second plate members such that the driven member is not caused to rotate in either direction, wherein said mechanism is carried by a vehicle and the driven member is operatively coupled with a vehicle implement for raising and lowering said implement as the driven member rotates in the first and second directions, and said shaft operatively drives the vehicle and the implement.

21. A mechanism for applying rotative force to a driven member comprising:

a shaft operatively rotatably driven by a power source, first and second plate members mounted with the shaft, said first and second plate members being spaced from one another to define a space therebetween, a disk to which the driven member is operatively coupled for rotation, said disk being positioned generally between the first and second plate members, said disk being pivotable to and between first, second and third positions, wherein:

in its first position, the disk abuts the first plate member for rotation therewith for causing the driven member to rotate in a first direction, in the second position, the disk abuts the second plate member for rotation therewith for causing the driven member to rotate in a second direction opposite to the first direction, and in the third position, the disk is spaced from both the first and second plate members such that the driven member is not caused to rotate in either direction, wherein the mechanism is carried by a vehicle and the driven member is operatively coupled with a vehicle implement for raising and lowering said implement as the driven member rotates in the first and second directions, the driven member further comprises a threaded rod member operatively coupled for rotation with the disk, a thread engaging member is engaged with the threads for shifting axially with respect to the rod member in first and second opposite directions as the rod member rotates in the first and second directions, respectively, and a pivotable lever member operatively engages the thread engaging member and is operatively coupled with the implement for raising and lowering the implement as the thread engaging member shifts in the first and second directions respectively.

22. A mechanism for applying rotative force to a driven member comprising:

a shaft operatively rotatably driven by a power source, first and second plate members mounted with the shaft, said first and second plate members being spaced from one another to define a space therebetween, a disk to which the driven member is operatively coupled for rotation, said disk being positioned generally between the first and second plate members, said disk being pivotable to and between first, second and third positions, wherein:

in its first position, the disk abuts the first plate member for rotation therewith for causing the driven member to rotate in a first direction, in the second position, the disk abuts the second plate member for rotation therewith for causing the driven member to rotate in a second direction opposite to the first direction, and in the third position, the disk is spaced from both the first and second plate members such that the driven member is not caused to rotate in either direction, the driven member further comprises a threaded rod member operatively coupled for rotation with the disk, a thread engaging member is engaged with the threads for shifting axially with respect to the rod member in first and second opposite directions as the rod member rotates in the first and second directions, respectively, said thread engaging member being shiftable within a range of positions on the rod member between first and second outermost positions, and said thread engaging member operatively abuts a first cam surface as the thread engaging member approaches the first outermost position, and said abutment of the thread engaging member against the first cam surface operatively pivots the threaded rod member and disk toward the third position.

23. The invention of claim 22, and further comprising a second cam surface against which the thread engaging member is operatively abutable for operatively pivoting the threaded rod member and disk toward the third position as the thread engaging member approaches the second outermost position.

* * * * *